Dec. 30, 1930.                H. L. DOHERTY                1,786,901
                        FLUID FUEL HEATING SYSTEM
                 Filed Dec. 23, 1925      2 Sheets-Sheet 2
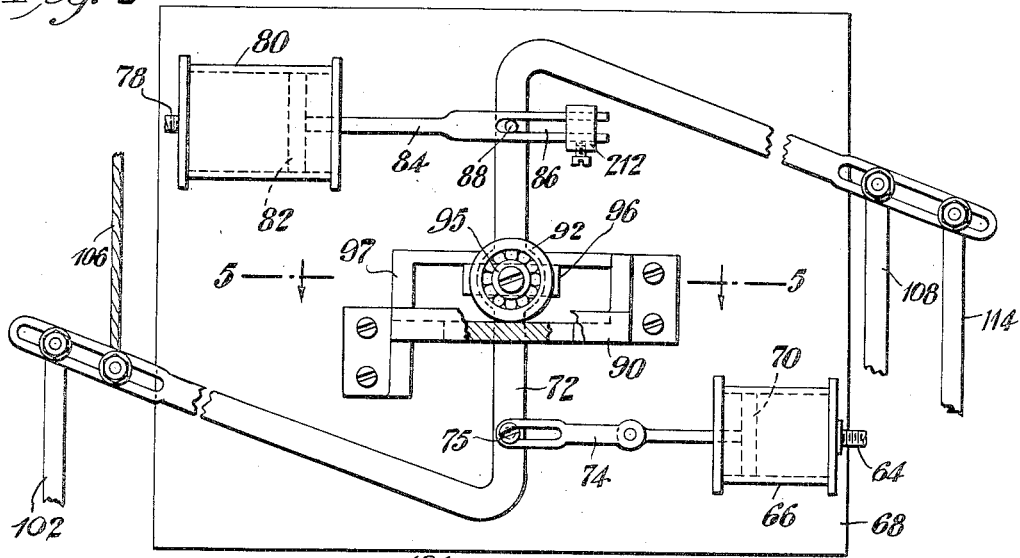
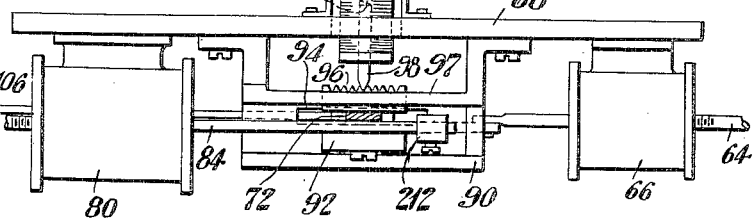
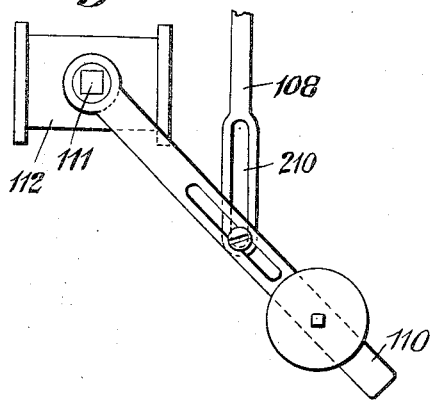
Henry L. Doherty Inventor
By His Attorney
Edmund G. Borden Patented Dec. 30, 1930

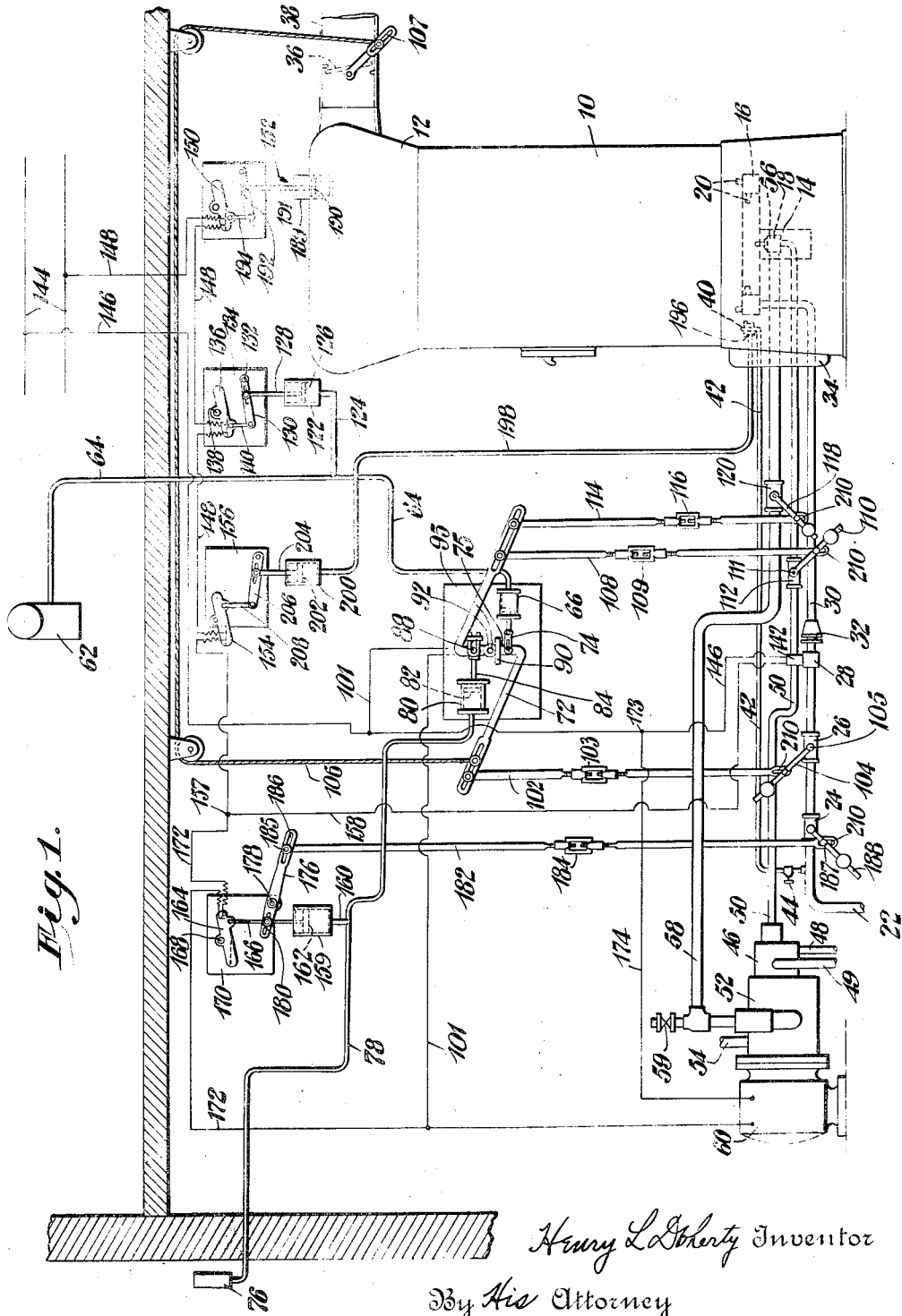

1,786,901

UNITED STATES PATENT OFFICE

HENRY L. DOHERTY, OF NEW YORK, N. Y., ASSIGNOR TO COMBUSTION UTILITIES CORPORATION, OF NEW YORK, N. Y., A CORPORATION OF MAINE

FLUID-FUEL HEATING SYSTEM

Application filed December 23, 1925. Serial No. 77,252.

The present invention relates to fluid fuel heating systems and more particularly to a method of and apparatus for regulating combustion in domestic heating furnaces arranged to burn both liquid and gaseous fuels.

The development of a market for automatic gas burning domestic heating furnaces has been greatly hampered heretofore by the high cost of the manufactured or natural gas required for their operation. A domestic heating system must be designed with sufficient capacity to supply heat for the coldest days of the year. Accordingly in order to supply gaseous fuel in sufficient volume and under suitable pressures to take care of a large number of domestic gas burning furnaces the gas company must provide generating equipment and a distributing system of sufficient capacity to take care not only of its normal industrial and domestic heating load but also of the seasonal peak loads created almost entirely by domestic heating appliances during periods of cold weather. The additional equipment to be provided by the gas company to take care of these peak loads will remain idle for most of the year, and for this reason if the gas for house heating is made to bear the proportionate amount of fixed charges incurred in its manufacture the cost of heating entirely by gas comes too high to be considered except by those having unusually large incomes.

A domestic house heating system has been recently developed in which a readily inflammable fuel such as manufactured or natural gas is relied upon to supply the normal heat requirements, the supply of gas being limited to a fixed amount so that when there is a seasonal demand for more heat than can be furnished by combustion of this fixed amount of gas the supply of gaseous fuel to the furnace will be supplemented by a relatively abundant and difficultly ignitable fuel such as the cheaper grades of fuel oil.

A dual fluid fuel burning heating system such as that referred to should meet with the approval of the householder because it possesses the advantages of a straight gas fired furnace and in addition is much more economical in operation because of using a relatively cheap grade of supplemental fuel. It should also meet with the approval of the gas manufacturer because it maintains a load on his lines which is relatively constant and which does not subject his equipment to the seasonal and undesirable peaks created by a system having high or unlimited gas requirements. Even with the wide adoption of oil and gas burning systems of the type above referred to, however, the ordinary gas company's generating equipment and distributing system will still have to be designed with sufficient capacity to take care of the unavoidable peak loads created by the use of radiant fires, gas logs and other heating equipment placed in operation by a large class of customers only during periods of extremely cold weather as an auxiliary to the more common coal and oil burning heating plants.

The primary object of the present invention is to provide a method of and apparatus for so governing the supply of fuel to a gas and oil burning domestic heating furnace that both the normal and the seasonal heating loads may be taken care of by burning oil alone during periods when the gas supply is deficient.

The ordinary thermostat control for domestic heating furnaces is so arranged that the dampers and valves in the fuel supply lines are opened wide to permit the furnace to operate at substantially maximum capacity until the house has been heated to the desired temperature, at which time under the control of a thermostat the dampers and fuel valves will be quickly closed and the fire immediately checked and allowed to carry on only at a minimum rate of combustion until the house is cooled down below the desired temperature. With this kind of control periods of rapid combustion in the furnace alternate with periods of very slow combustion, causing a wide fluctuation in the rate at which heat is supplied by the furnace, whereas if a uniform change in combustion conditions could be effected a substantially uniform temperature would be maintained in the house and a better combustion efficiency obtained.

Another object of the present invention is to provide a method of and apparatus for gradually varying the supply of fuel to a gas and oil burning domestic heating furnace in inverse proportion to the temperature changes set up, thus creating a regulated uniform combustion rather than a spasmodic varying combustion in the furnace.

With these objects in view, one feature of the present invention contemplates supplying gas alone to a gas and oil burning furnace to carry the normal heating load, gradually varying the supply of gas in direct proportion to the heat requirements of the house as measured by changes in the indoor and outdoor temperatures, and gradually cutting off the supply of gaseous fuel and substituting oil therefor and vice versa whenever the outdoor temperatures fall below or rise above a predetermined point at which experience shows that the seasonal peak load created by the use of radiant fires, gas logs and other auxiliary heating equipment make heavy demands on the gas company's generating equipment and distributing system.

In the usual control of a domestic heating furnace with a thermostat, the control depends entirely upon the temperature of the room in which the thermostat is located. This control of the furnace is not always satisfactory or accurate because the outdoor temperature often varies widely and very much more rapidly than the indoor temperature and the heat requirements on the furnace are most accurately measured by the rise and fall in outdoor temperature. Thus if the outside temperature should fall quite rapidly there may be a considerable lapse of time before the inside temperature will fall sufficiently to set the thermostat in operation to turn on the fuel supply and open the dampers to allow increased combustion, and before the heat furnished by the combustion thus set up reaches the room the temperature may have dropped to an uncomfortably low point.

Accordingly, another object of the present invention is to provide for the automatic regulation of a gas and oil burning domestic furnace to maintain a substantially uniform indoor temperature irrespective of the fluctuations in the outdoor temperature.

With this object in view another feature of the invention contemplates controlling the supply of fuel to the furnace in accordance with the temperature differential existing between the outside and inside temperatures of the house being heated, cutting off the fuel supply whenever a predetermined temperature has been produced in the house by the combustion of the fuel, and effecting a gradual and at times complete substitution of one fuel for another whenever the temperature outside the house reaches a predetermined maximum or minimum point.

With these and other objects and features in view the invention consists in the improved method of and apparatus for regulating combustion in gas and oil burning domestic heating furnaces hereinafter described and particularly defined in the claims.

The various features of the invention are illustrated by the accompanying drawings, in which Fig. 1 is a diagrammatic view of a section of the basement and upper part of a dwelling showing a dual fluid fuel burning heating furnace and combustion control apparatus suitable for carrying out the method embodying the preferred form of the invention;

Fig. 2 is an enlarged view in elevation, with parts cut away, of the combined floating lever and plunger actuating mechanism illustrated in the central part of Fig. 1;

Fig. 3 is a plan view of the floating lever and plunger actuating mechanism illustrated in Fig. 2;

Fig. 4 is an enlarged view in elevation of one of the valves for controlling the fuel supply, illustrated in Fig. 1; and Fig. 5 is a horizontal cross sectional view of the bearing supporting the lever, taken on the line 5—5 of Fig. 2.

In Fig. 1 of the drawings a furnace 10 of the ordinary house heating type is shown, designed with a dome 12 to heat water, air or other circulating medium which is then preferably conducted through pipes or other means (not shown) to that portion of the building which it is desired to heat. In case the furnace 10 which it is contemplated using has been provided with grates for the purpose of burning coal or other solid fuel, these are preferably removed and a combined gas and oil or other dual fluid fuel burner apparatus 14 of some standard type substituted therefor. The burner apparatus illustrated in the drawing comprises essentially an annular or ring-shaped gas burner 16 through the central opening of which there projects an oil atomizing nozzle 18. The gas burner 16 is also shown as equipped with a number of individual burner tips 20 extending in a ring around its inner periphery so that flames issuing therefrom may converge to throw a sheet of flame at substantially right angles across the area through which a jet of atomized oil issuing from the centrally located oil nozzle 18 must pass.

The gas burner 16 is supplied with gas, which may be the ordinary city gas, through a main or pipe 22. In that portion of the main 22 adjacent the burner 20 are positioned three control valves 24, 26 and 28, and between the nearest of these valves and the burner there is inserted a mixing chamber 30 shown as equipped with a manually operated shutter 32 for regulating the amount of primary air admitted to the mixing chamber and burner 20. Although not illustrated the operation of the shutter 32 may be placed under the automatic control of the mechanisms to be hereinafter described. In addition to whatever primary air is admitted into the mixing chamber 20 secondary air is drawn into the furnace during operation through openings in the ash door 34 in sufficient quantity to effect complete and efficient combustion of whatever fuel is being supplied to the furnace, the rate of combustion in the furnace and the amount of secondary air admitted to the furnace being under control of a damper 36 in the flue 38. Automatic means to be hereinafter described are provided for operating the damper 36 and the valves 24, 26 and 28 in the fuel supply line in accordance with the need for heat to be delivered to the house by the system of which the burner apparatus 14 is a part. In order to insure ignition of the gas issuing from the tips of burner 20 a pilot light 40 is positioned in close proximity to burner 20 and is continuously supplied with gas from the main 22 through a pipe 42. The amount of gas which it is desired to burn in the pilot 40 is under the control of a hand valve 44.

The capacity of the gas burner 20 is preferably sufficient to supply the normal heat requirements of the house and the present invention in its preferred form contemplates the use of gas alone as the normal load fuel. However, in order to relieve the gas company of the burden of supplying sufficient gas to meet the normal demand and also the relatively large amount of additional gas required to generate sufficient heat to meet the seasonal heat requirements of the house during periods of unusually cold weather, it is proposed according to the present invention to cut out the gas supply to burner 20 and to bring the oil burner 18 into operation, the change from gas to oil and vice versa being under the control of a thermostat subject to the outdoor temperature, as will hereinafter be more fully described.

Oil or other liquid fuel for supplying the burner 18 is preferably drawn from a storage tank or other source of supply (not shown) to the suction side of an oil pump 46 through a pipe 48. Excess oil drawn in by the pump is returned to storage through a pipe 49. A pipe 50 connects the delivery side of pump 46 with the burner nozzle 18. The primary air supply for burning the oil passed by pump 46 to nozzle 18 enters a blower unit 52 through a screened inlet 54 and is conducted from the delivery side of the blower to a mixing chamber 56 in the base of nozzle 18 by a pipe 58. Any excess air over that required for burning the oil is bled off through a valve 59. In the drawing the oil pump 46 and the blower unit 52 are shown as mounted on a common shaft for operation by a comon prime mover, illustrated as an electric motor 60. The burner construction 14 and the means illustrated for supplying fuel to the same may be of almost any standard form and constitute no part of the present invention.

The various mechanisms employed for effectuating the control of the fuel supply to the burner 14 and of combustion in the furnace do not in themselves form any part of the present invention, although it is believed that their combination as illustrated and hereinafter described produces a result which is novel. As previously pointed out one of the chief purposes of the present invention is to place the fuel supply to the furnace 10 under the control both of the temperature inside the house and the temperature outside the house, in order to maintain a more uniform indoor temperature and a more uniform and efficient combustion in the furnace. In accordance with this object the apparatus for carrying out the present invention includes a temperature measuring device responsive to the temperature in that part of the house which it is desired to heat, shown in the drawings as comprising a liquid thermostat 62 connected by means of a tube 64 with a motor 66. The fluid medium with which the thermostat 62 and the cylinder of motor 66 is filled is preferably chosen to register a relatively large volume change in measuring a relatively small range of indoor temperatures. The motor 66 is attached to a panel 68 (see Figs. 2 and 3) and is equipped with a plunger 70 arranged to operate in accordance with the contraction or expansion of the operating fluid filling the motor, tube 64, and thermostat 62, due to change in temperature in the room where thermostat 62 is located. As the plunger 70 moves back and forth in cylinder 66 it moves a pivoted lever 72, to one arm of which it is connected by means of a link 74 and a pin 75. A second fluid thermostat 76 is shown mounted on the outside of the house and connected by means of a tube 78 with a cylinder 80 similar in construction but preferably of larger capacity than cylinder 66 (see Figs. 1, 2 and 3). Cylinder 80 is also attached to panel 68 and is fitted with a plunger 82 arranged to slide back and forth in accordance with the contraction and expansion of the fluid in cylinder 80, tube 78 and thermostat 76 due to changes in the outside weather temperature. As the plunger 82 moves back and forth it may also move the lever 72, to the upper arm of which it is movably connected by means of a link 84 having an adjustable slotted portion 86 engaging a pin 88. The lever 72 is held to the panel 68 by a bracket 90 (see Fig. 2), the lever itself being provided with a ball bearing 92 which is movably mounted on the bracket 90. A slot 94 (see Fig. 3) cut in the bracket 90 is of sufficient size to permit some lateral movement of the lever 72, and the whole construction is such as to allow the center of rotation of the lever to vary to permit the motors 66 and 80 to operate jointly in opposition to each other to control the movement of the lever 72 in accordance with the varying differentials between the temperatures registered by thermostats 62 and 76. The inner rim 95 of bearing 92 extends beyond the rear of the bearing (see Figs. 3 and 5) and is rigidly attached to a horizontally positioned rack member 96. This rack member and rim 95 are prevented from rotating with the outer rim of bearing 92 by a guide member 97 on bracket 90. A pin 98 wich forms the armature of a standard type of solenoid 99 is normally held in engagement with one of the teeth of rack 96 by a compression spring 100. In the drawings the solenoid is shown with its terminals connected to a branch circuit 101 taken off from the two leads of a circuit energizing the oil pump motor 60, to be hereinafter described. The circuit of the oil pump motor and likewise circuit 101 are both preferably closed only during periods in which the outdoor temperature as measured by thermostat 76 remains below a predetermined point, so that as long as the outdoor temperature remains above this point the pin 98 bears against rack 96 and holds the center of rotation at lever 72 stationary, thus preventing any lateral movement of the lever. During the periods in which pin 98 engages the teeth of rack 96 the slotted portion 86 of link 84 is preferably adjusted to hold it out of engagement with pin 88, so that the movement of lever 72 will be under the sole control of the changes in indoor temperature registered by thermostat 62, and will be entirely independent of the changes in outdoor temperature registered by thermostat 76. However when the outdoor temperature drops below the aforementioned predetermined point means to be hereinafter described are provided for closing the circuit to the motor 60 and branch circuit 101, thus energizing solenoid 99 and immediately drawing pin 98 out of engagement with the teeth of rack 96. At the same time an adjusting member of slot 86 of the link 94 to be hereinafter mentioned is preferably set to engage pin 88 on lever 72, thereby placing the movement of lever 72 under the control of outdoor thermostat 76 so that so long as the outdoor temperature remains below such predetermined point the movement of lever 72 is controlled in accordance with the differential between indoor and outdoor temperatures, the lever being free to move laterally in slot 94.

In order to transmit the temperature changes indicated by the thermostats 62 and 76, acting independently or in conjunction, to the fuel supply lines for burner apparatus 14 and to damper 36, the lower end of the lever 72 is connected by means of a rod 102, the length of which can be adjusted by means of a turn buckle 103, with a weighted arm 104 on the stem 105 of gas control valve 26. Likewise the lower arm of the lever 72 is connected by means of a cable 106 with a slotted link 107 attached to the damper 36. A link 108 similar to link 102 and equipped with a turn buckle 109 connects the upper arm of lever 72 with a weighted arm 110 attached to the stem 111 of valve 112 in the oil supply line 50 leading to nozzle 18. Another link 114 equipped with a turn buckle 116 connects the upper arm of lever 72 with a weighted arm 118 arranged to operate the valve 120 in the air supply line 58 leading to nozzle 18.

It is desirable to cut off the fuel supply to the furnace whenever the temperature in the room rises much above the desired point. In order to effect this control an additional motor 122 (see Fig. 1) is connected to the thermostat 62 and tube 64 by a branch tube 124. The plunger 126 of this motor is connected by a link 128 with a lever 130 which is in turn pivoted at 132 to a panel 134. A standard form of mercoid tipping switch 136 is also pivoted to panel 134 by a pin or other means 138 and this tipping switch is connected to the free end of lever 130 by a link 140. The valve 28 shown in the gas pipe 22 leading to burner 20 is arranged to operate as a snap valve, its weighted stem serving as the armature of a solenoid 142 of some standard type. It is by this valve that the supply of gas to burner 20 is cut off whenever the temperature in the room in which the thermostat 62 is located exceeds by a predetermined small amount the desired point. The power circuit for energizing solenoid 142 is taken from the main circuit 144. One of the lead wires 146 of the circuit energizing the solenoid passes directly to a terminal point on the solenoid, while the other lead 148 is broken and has both broken ends sealed in a normally closed switch 150 forming part of a boiler temperature safety thermostat 152. An extension of lead wire 148 which is sealed in switch 150 of the boiler safety thermostat is again broken and the both broken ends sealed in the switch 136, already mentioned as forming a part of the room temperature thermostat and controlled through motor 122. From switch 136 a further extension of lead 148 passes to and is broken and sealed in a normally closed tipping switch 154 forming part of a pilot light safety thermostat arrangement 156. From switch 154 the continuation of lead 148 is coupled at 157 to a wire 158 connected to the other terminal of solenoid 142. Assuming that switches 150 and 154 are closed when the maximum desired room temperature has been reached the movable plunger 126 of motor 122 will be forced to its highest point through the expansion of the fluid in the thermostat 62, with the result that switch 136 will be tipped in the opposite direction to that illustrated in the drawing, thus breaking the circuit to solenoid 142, with the result that the solenoid is deenergized and the weighted armature drops to close valve 28. As the room temperature drops again and before the desired point has been reached at which the room thermostat again calls for heat the plunger 126 sinks in motor 122, due to contraction of fluid in thermostat 62, and its motion is transmitted by link 128, arm 130 and link 140 to the switch 136, which will again assume the position illustrated in the drawings, the mercury making contact with both ends of the lead 148 and closing the circuit to solenoid 142. The solenoid being thus energized the stem of snap valve 28 is again raised to permit gas to flow to burner 20.

In order to bring the oil pump 46, blower 52 and atomizing nozzle 18 into operation another motor cylinder indicated as 159 is connected to the tube leading from the thermostat 76 by a branch tube 160. The operating fluid employed in thermostat 76, tubes 78 and 160 and motors 80 and 159 is preferably chosen to register a relatively small volume change over a relatively large temperature range, say 20-50° F., thus possessing a much smaller co-efficient of expansion than the fluid employed in room thermostat 62. Any drop in outdoor temperature as measured by the thermostat 76 causes a contraction of the fluid in the outside temperature thermostat system which is indicated by the downward movement of a plunger 162 in motor 159. This movement is communicated to a tipping switch 164 by a link 166, switch 164 being pivoted at 168 to the panel 170. Plunger 162, link 166 and switch 164 are preferably so arranged that the mercury filling the switch closes the contact between the two ends of a wire 172 sealed therein at the instant that the outside temperature drops to a predetermined point at which experience has shown that the coming on of radiant fires, gas logs and other auxiliary heating equipment will create a peak load on the manufacturing equipment and distributing system of the gas company. One end of the wire 172 is connected at 157 to the lead 148 of the circuit normally energizing the solenoid 142 on gas control valve 28, while its other end is connected to one of the terminals of motor 60. The other terminal of motor 60 is connected at 173 by a wire 174 with the lead 146 of the circuit energizing solenoid 142. In this way motor 60 and solenoid 142 are connected in parallel, but the motor circuit comprising wires 172 and 174 is normally open for the reason that contact between the two ends of wires 172 which are sealed in switch 164 is broken except when the outdoor temperatures is at or below the point at which the gas company expects peak loads on its equipment. When the switch 164 of the outside thermostat mechanism is closed the motor 60 will be free to operate except when one of the three normally closed switches 154, 136 or 150 is opened. The circuit to the motor being closed the oil pump 46 and the air blower 52 immediately begin to operate. The oil-air mixture issuing from the nozzle 18 will be ignited by the flames from the jets of the surrounding gas burner 20.

Having thus put the oil pump and oil burner in operation it is desirable to cut down and in some cases entirely cut off the supply of gas to the gas burner 20 in order to relieve the load on the gas company's equipment. To effect this result a lever 176 is pivoted to the panel 170 at the point 178 and one end of this lever is adjustably connected to the link 166 of the outdoor thermostat mechanism by a pin and slot connection 180. A link 182, having a turn buckle adjustment 184, is fastened at one end by an adjusting screw and pin 185 to the slotted end 186 of the lever 176 lying to the right of the pivotal point 178 and its other end is connected by a slot and pin connection 187 with a weighted arm 188 on the stem of valve 24 in the gas pipe 22.

The control system illustrated includes two safety devices, one for shutting down the fuel supply to the furnace in case the pilot light becomes extinguished for any reason and the other for shutting down the fuel supply whenever the temperature of the boiler exceeds the point of safe operation. The boiler safety device 152 comprises essentially a motor cylinder 189 enclosing a plunger 190 arranged to move back and forth in the cylinder in accordance with the rise and fall of temperature in the boiler. The motion of this plunger is transmitted to the mercoid tipping switch 150, previously mentioned, through a rod 191, pivoted arm 192 and link 194. The boiler safety device is so set that whenever the safe operating temperature of the boiler is exceeded switch 150 will be moved out of its normal position as illustrated in the drawing and contact between the two sealed ends of lead 148 will thus be broken, causing an immediate closing of valve 28 in the supply line to gas burner 20 and also an immediate shutdown of the motor driving oil pump 46, in case the oil pump is in operation.

The pilot safety device 156, in addition to the switch 154 already mentioned, includes a small fluid thermostat 196 encircling the tip of the pilot burner 40 and connected by a tube 198 with a motor cylinder 200. Expansion or contraction of the fluid in thermostat 196, tube 198 and cylinder 200 imparts motion to a plunger 202 and the movement of this plunger is imparted to tipping switch 154 through a stem 204, a pivoted arm 206 and a link 208. When the pilot light is burning the heat generated thereby makes itself felt on the device 156 to hold the switch 154 in the normally closed position in which it is illustrated. If for any reason the pilot light is extinguished the operating fluid in thermostat 196, tube 198 and cylinder 200 will almost immediately contract, allowing the plunger 202 to drop and throwing the switch 154 open, thus breaking the circuits of solenoid 142 and motor 60 and cutting off the flow of gas and oil to the furnace.

In order to maintain substantially uniform temperatures in the house and substantially uniform and efficient combustion in the furnace it is desirable to so control the supply of fuel that any change in heat requirements will be taken care of by a gradual rather than a complete or snap opening and closing of the fuel valves. For this reason the valves controlling the supply of gas, air and oil to the furnace, with the single exception of valve 28, are all provided with weighted arms arranged to hold them normally in open or closed position as the case may be, any departure from this normal position being effected gradually and in direct proportion to changes in the inside and/or outside temperature through the temperature control mechanism above described. The valve 28 is purposely made a snap valve to be normally held open, but to be instantly closed in case the room temperature is raised to any considerable extent above the desired point, or in case the furnace becomes overheated or in case the pilot burner becomes extinguished. Each of the links 102, 108, 114 and 182 is equipped with a turn buckle adjustment by means of which it is possible to adjust the length of the link and the degree of opening of each of the valves with respect to any given position of the floating lever 72. One advantage of this adjusting feature is that it makes it possible to set the opening of valve 112 in oil line 50, for instance, so that at the instant when the outdoor thermostat mechanism starts the motor 60 and oil pump 46, sufficient oil will be immediately passed to the nozzle 18 to provide a healthy oil flame.

Except during periods of cold weather when the system is operating on oil fuel, valves 112 and 120 will be in the closed position illustrated in the drawing. Likewise valve 24 will normally remain open, assuming the position illustrated. The purpose of the slots 210 in the valve stem ends of links 102, 108, 114 and 182 is to allow a considerable amount of lost motion or range of movement of the links in an upward direction before setting into motion the stems of valves 24, 26, 112 and 120. As already pointed out it is purposed to govern the opening or closing of these valves in direct proportion to the temperature changes taking place in the room and/or outside the house. For instance up until the time that the outdoor thermostat mechanism acts to put the oil pump and burner in operation it is desirable to keep valve 24 open wide and to control the supply of gas to burner 16 entirely by valves 26 and 28. However at the instant that the oil pump is started up valves 26 and 28 will both ordinarily be wide open to pass the maximum supply of gas to burner 20, and as these valves will continue to remain open so long as the room thermostat calls for heat, it is desirable to set valve 24 in operation as soon as the oil pump and oil burner are started up so as to gradually cut off the supply of gas to burner 20 proportionately as the outside temperature drops and as valves 112 and 120 are gradually thrown further open. By reason of the slot 210 in the lower end of link 182 the drop in outside temperature registered by the outdoor thermostat mechanism has no effect on the closing of valve 24 until all the slack is taken out by the upward movement of link 182 and the downward movement of plunger 162. Preferably this slack should be capable of adjustment to set the valve 24 in operation at the same instant that contact in the switch 164 is closed to set the oil pump and oil burner in operation. The amount of slack provided by the slot 86 and pin 88 which make up the connection between the plunger 82 of motor 80 and the upper arm of lever 72 is adjustable by means of a sliding clamp 212. The position in which the clamp is set is primarily dependent upon whether it is desired to control valve 26 and damper 36 solely by the room thermostat mechanism at temperatures above the critical outdoor temperature for which thermostat 76 is set, or by means of the temperature differential between outdoor and indoor temperatures as measured by thermostats 76 and 62 respectively.

Preferably the differential temperature control of the fuel supply is used only at temperatures below the critical outdoor temperature and above that temperature the supply of gas to the burner 16 is placed under the sole control of the indoor thermostat operating on valve 26. According to this preferred method of control, valve 26 is gradually thrown open proportionately with the drop in indoor temperature through a small range below the desired point i. e. 70° F. and is gradually closed as the indoor temperature rises to 70° F. Switch 136 is preferably set to open circuit 148 and close valve 28 only at a temperature several degrees above the desired room temperature, say 74° F., thus functioning in much the same way as the furnace safety switch 150. However when the differential temperature control of the fuel supply is used throughout the full range of outdoor temperatures—both above and below the critical point—switch 136 may be set to open or close the circuit to valve 28 at approximately the desired room temperature in case it is found that the links of the control mechanism connected to lever 72 cannot be properly adjusted to effect a gradual and complete cutting off of the fuel supply, through valves 26 and 112 respectively, whenever the room temperature rises to the desired point.

The combustion regulating apparatus of the present invention is applied specifically to a domestic heating furnace of the type adapted to burn two kinds of fluid fuel, preferably gas and oil. The control apparatus is preferably built up in a unit construction and located immediately adjacent the furnace. The automatic control for the burners consists primarily of a thermostat placed in a room of the house to be heated and another thermostat placed outside the house, together with mechanisms under the control of one or both thermostats for governing the amount of fuel passed to the burners and the draft through the furnace. If the room in which the thermostat is located is at or above the normal temperature desired, say for example 70° F., the burners will be preferably turned off and nothing but the pilot burner 40 will be burning. Before the indoor temperature falls below 70° F. the indoor temperature controlled thermostat will operate through switch 136 to close the power circuit to solenoid valve 28 so that as soon as the temperature drops below 70° the room thermostat will operate through lever 72 and link 102 to open valve 26 and gas will be introduced into the mixing pipe 30 and flow to the gas burner 20. The indoor thermostat mechanism is arranged to open valve 26 to pass gas in gradually increasing amounts to the gas burner, the degree of opening of valve 26 being directly proportional to the heat requirements of the house as measured by the contraction of the working fluid in thermostat 62 caused by the dropping of the room temperature through the small range of temperature allowable in the house and for which the indoor thermostat is set. The gas supply as measured by valve 26 is preferably sufficient to take care of the heat requirements of the house during periods of normal outdoor temperature, say about 50° F., it being assumed that the temperature requirements of the house are substantially inversely proportional to the outdoor temperatures.

In the drawings the various units of apparatus are shown in the position which they assume when the gas burner 20 is in operation and when the oil burner 18 and oil pump 46 and blower 52 are shut down. More specifically the control apparatus is shown in the position which it assumes at the instant that the room thermostat registers a call for heat after having shut down the fuel supply owing to the heating system having developed the desired room temperature. Thus the plunger 70 in cylinder 66 is shown as just beginning its backward stroke, with switch 136 just closed by the downward movement of plunger 126 in cylinder 122 and valve 26 just beginning a gradual opening in response to the downward movement of the lower arm of lever 72. If the outdoor weather is mild a slight opening of valve 26 may admit sufficient gas to again raise the room temperature to the desired point for which thermostat 62 is set, namely 70° F. Assuming more severe outdoor temperature conditions valve 26 will continue its gradual opening, the rapidity of which will be directly proportional to the rate at which the indoor temperature drops through a range of say two or three degrees F.; or in case clamp 212 is set close up to pin 88, and solenoid 99 is energized by some other circuit than that shown to draw pin 98 out of engagement with rack 96, the rate at which valve 26 opens will be proportional to the rate of increase in temperature differential between the indoor and outdoor temperatures as measured by thermostats 62 and 76 acting together on the floating lever 72. Ordinarily valve 26 will be wide open whenever the indoor temperature drops to the minimum point for which the indoor thermostat is set or whenever the outdoor temperature drops to the critical point for which thermostat 76 is set.

If the outdoor temperature continues to drop below the critical point for which the outdoor thermostat 76 is set switch 164 will be tipped into a position closing the circuit to motor 60, and the oil pump 46 and blower 52 will be set in operation to supply oil and air to oil burner 18. By the time the amount of gas supplied to the gas burner has reached a maximum the interior of the furnace will be highly heated and therefore when the oil is introduced through nozzle 18 it will be atomized into the gas flame from burner 20 and into the highly heated fire pot of the furnace. At the same time that the outdoor thermostat places the oil burner in operation the slack provided by slot 210 in rod 182 will preferably all have been taken up and the outdoor temperature control thermostat mechanism will operate through rod 182 to gradually close valve 24, illustrated in the drawings as in the full open position which it normally assumes. Preferably at some time before the outdoor thermostat acts to place oil burner 18 in operation and closes valve 24 all of the slack provided by the slots 210 at the lower ends of rods 108 and 114 will be taken up by the upward movement of the upper arm of lever 72, so that at the time oil pump and air blower are started valves 112 and 120 will have already been partially opened to admit a sufficient volume of combustible mixture through nozzle 18 to provide a steady and reliable flame. The amount of oil flowing to burner 18 will gradually increase as valve 112 is thrown wider open to take care of a continued drop in outdoor temperature and/or a continued increase in differential between indoor and outdoor temperatures, the increase in the amount of oil supplied being substantially proportional to the drop in outdoor temperature. During periods in which the outdoor temperature is only a few degrees below the critical point for which thermostat 76 is set, say for instance ten degrees, gas will be burning in the furnace at the same time that oil is being supplied through burner 18, the amount of gas burned being proportional to the degree of opening of valve 24 and the amount of oil being proportional to the degree of opening of valve 112, since oil pump 46 operates at a constant speed and handles uniform volumes of oil. Both fuels continue to burn in the furnace so long as the outdoor temperature remains within this range, i. e. 40–50° F., or until the heat supplied by the furnace is sufficient to raise the temperature in the room of the house in which thermostat 62 is placed to normal. Whenever the outdoor temperature drops below the minimum critical point, namely 40° F., the supply of gas to burner 20 will be entirely shut off by the full closing of valve 24, and so long as the outdoor temperature remains below that critical point all the heat requirements of the house will be taken care of by the combustion of the oil supplied to burner 18. The capacity of the oil supply system and burner 18 will be preferably sufficient to maintain the desired temperature in the house under the most extreme outdoor weather conditions. If the outdoor temperature begins to rise, on reaching the 40° F. point the rising temperature will first make itself felt by slacking up on the control mechanism and rod 182 to allow valve 24 to crack to start a flow of gas to burner 20. As the outdoor temperature continues to rise valve 24 will open proportionately wider so that at the time the critical outdoor temperature of 50° F. is reached and oil burner 18 is thrown out of operation by the opening of switch 164, valve 24 will have assumed a full open position and the volume of gas being supplied to burner 20 will depend upon the adjustment of valve 26 to carry the heating load on the apparatus. If the outdoor temperature continues to rise the continually decreasing heat requirements of the house will be taken care of by a proportionately decreasing amount of gas passed by valve 26.

Whenever the temperature of the furnace reaches a point at which it is unsafe to continue operation thermostat 152 will break the circuit to valve 28 and to motor 60, cutting off the supply of gas and oil to burners 20 and 18. Likewise in case the pilot light 40 is extinguished from any cause thermostat 156 acts immediately to break the power circuits of solenoid 142 and motor 60, thereby cutting off the supply of gas and oil to the respective burners. Immediately upon the dropping of the furnace temperature to a safe point or the re-ignition of pilot 40 the fuel supply will be turned on again, providing the room thermostat is in a call-for-heat position.

In this way gas or similar readily volatile and more expensive fluid fuel is used as the normal load fuel, the supply to be gradually increased and decreased proportionately as the heat demands of the house require. When, however, the outdoor temperature is such as to place a peak load on the gas company's equipment, due to the coming on of gas logs and other auxiliary heating equipment, the oil burner will be turned on to take the place of the gas burner in supplying the heat demands of the system. It will be seen that the present invention provides a heating system particularly adapted, although not limited, to household purposes in that it is fully automatic and also safe and rugged in operation. Moreover, the system operating according to the present invention can be made much more economical for the householder than a straight gas fired heating system and at the same time furnishes the gas company with a more desirable load than that of the straight gas fired furnace, for the reason that it releases gas rather than demanding more gas during the periods in which the gas company by experience has learned to expect the heaviest burdens on its equipment.

While the foregoing disclosure is more or less specific in character the appended claims are not to be construed as limited to details of such disclosure, except as to details defined in the claims.

The invention having been thus described, what is claimed as new is:

1. In a fluid fuel heating system, in combination, two fluid fuel burners, one adapted to burn a base fuel and one adapted to burn a secondary fuel, normally inoperative means for supplying fuel to said secondary fuel burner, and mechanism responsive to changes in temperature operable to place said means in operation and to simultaneously restrict the supply of fuel to said base fuel burner.

2. In a fluid fuel heating system, in combination, two fluid fuel burners, one adapted to burn a base fuel and one adapted to burn a secondary fuel, means responsive to changes in heat demand on said system, and mechanism under control of said heat responsive means for automatically proportioning the supply of fuel to said burners and the supply of air for burning said fuel in accordance with the varying heat demand.

3. The combination with a domestic heating furnace including a fluid fuel burner, of a mechanism arranged to operate in accordance with variations in differential between indoor and outdoor temperatures to measure the heat demand on the furnace, and means under the control of said mechanism for proportioning the fuel supply to the burner and the air for burning said fuel in accordance with the heat demand on the furnace.

4. The combination with a domestic heating furnace including a fluid fuel burner, of a thermostat responsive to changes in indoor temperature and another thermostat responsive to changes in outdoor temperature, each of said thermostats comprising essentially a fluid filled thermometer and a fluid filled motor with connections between the thermometer and the cylinder of the motor, a mechanism arranged to operate in accordance with the differential fluid pressure exerted on the plungers of said motor to measure the heat demand on the furnace, and means under the control of said mechanism for proportioning the fuel supply to the burner and the air for burning said fuel in accordance with the heat demand on the furnace.

5. The combination with a domestic heating furnace including a fluid fuel burner, of a thermostat responsive to changes in indoor temperature and another thermostat responsive to changes in outdoor temperature, each of said thermostats comprising essentially a fluid thermometer and a fluid motor with connections between the thermometer and the cylinder of the motor, a mechanism arranged to operate in accordance with variations in differential between indoor and outdoor temperatures to measure the heat demand on the furnace, said mechanism comprising essentially a lever rotatable about a floating pivotal point through the medium of links connecting it with the motor plungers of said thermostats, and means under the control of said mechanism for proportioning the fuel supply to the burner and the air for burning said fuel in accordance with the heat demand on the furnace.

6. The combination with a domestic heating furnace including a fluid fuel burner, of a mechanism responsive to changes in differential between indoor and outdoor temperatures, means under control of said mechanism for proportioning the fuel supply to the burner and the air supply for burning said fuel in accordance with the changing heat demand on the furnace as measured by said differential and means for taking said mechanism out of the control of said outdoor temperature to permit it to function solely in accordance with changes in indoor temperature.

7. The combination with a domestic heating furnace including a fluid fuel burner, of a thermostat responsive to changes in room temperature, a device under the control of said thermostat for automatically turning on a supply of fuel to said burner whenever said thermostat registers a call for heat, and means under the control of said thermostat for automatically proportioning the supply of fuel to said burner and the supply of air to burn said fuel in accordance with the changes in indoor temperature.

8. The combination with a domestic heating furnace including a fluid fuel burner, of a thermostat responsive to changes in weather temperature, and means under the control of said thermostat for automatically proportioning the supply of fuel to said burner and the supply of air to burn said fuel in accordance with the changes in weather temperature.

9. The combination with a domestic heating furnace including a fluid fuel burner, of a thermostat responsive to changes in room temperature and a thermostat responsive to changes in weather temperature, a mechanism under the control of both of said thermostats for measuring the heat demand on the furnace, and means under the control of said mechanism for automatically proportioning the supply of fuel to the burner and the supply of air for burning said fuel in accordance with the heat demand on the furnace.

10. The combination with a heating furnace including two fluid fuel burners, of a thermostat responsive to changes in weather temperature, a device under the control of said thermostat for automatically proportioning the supply of fuel to one of said burners in accordance with the fall and rise of weather temperatures between predetermined maximum and minimum points, means under the control of said thermostat for cutting off the supply of fuel to said burner whenever the outdoor temperature drops below said minimum point, a mechanism adapted to feed fuel to the other burner, and means controlled by said thermostat for setting said mechanism into operation whenever the outdoor temperature falls below said predetermined minimum point.

11. The combination with a domestic heating furnace including two fluid fuel burners, of a thermostat responsive to changes in room temperature and a thermostat responsive to changes in weather temperature, means under the control of said room thermostat for automatically turning on a supply of fuel to one of said burners whenever said thermostat registers a call for heat, a mechanism under the control of both of said thermostats for automatically proportioning the supply of fuel to said burner in accordance with the demand for heat on the system, means controlled by said weather thermostat for cutting off the supply of fuel to said burner whenever the outdoor temperature drops below a predetermined point, a device adapted to feed fuel to the other burner, and means controlled by said weather thermostat for setting said device into operation before cutting off the supply of fuel to said first mentioned burner.

12. A house heating system comprising a furnace, a gas burner and an oil burner therein, separate means for controlling respectively the supply of gas to said gas burner, the supply of oil to said oil burner and the supply of air for supporting combustion in said furnace, means responsive to the heat demands on said system, and mechanism under the control of said heat responsive means for proportioning the supplies of gas, oil and air to said furnace in accordance with the varying heat demands.

13. A domestic heating system including a furnace, a gas burner and an oil burner in said furnace, means associated with said burners for automatically proportioning the supply of gas to said gas burner in accordance with the normal heat requirements of the system, means acting to automatically turn on the supply of oil to said oil burner and to simultaneously shut off the supply of gas to said gas burner whenever the heat requirements of the system exceed normal, both of said means acting to first turn off the supply of oil to the oil burner and thereafter to supply gas in decreasing amounts to the gas burner whenever the heat requirements of the system fall off.

14. The combination with a heating furnace including a fluid fuel burner, of a thermostat responsive to changes in temperature set up by combustion in said furnace, another thermostat responsive to changes in weather temperature, and a device under the control of both of said thermostats for proportioning the supply of fuel to said burner and the draft on said furnace in accordance with changes in differential between the weather temperature and the temperature set up by said furnace.

15. The combination with a domestic heating system including a furnace and a gas burner and an oil burner in said furnace, of a device permitting gas to flow to the gas burner whenever the indoor temperature drops below a predetermined point, a device for shutting off the flow of gas to the gas burner whenever the outdoor temperature drops below a predetermined point, mechanism adapted to feed oil to the oil burner, and means for setting said mechanism into operation at about the time that the last mentioned device operates to cut off the flow of gas to the gas burner and for rendering said mechanism inoperative so long as the outdoor temperature remains above said predetermined point.

16. The combination with a domestic heating system including a furnace and a gas burner and an oil burner in said furnace, of a device permitting gas to flow to the gas burner whenever the indoor temperature drops below a predetermined point, a separate device permitting gas to flow to the gas burner so long as the outdoor temperature remains above a predetermined point, mechanism adapted to feed oil to the oil burner, and means responsive to changes in outdoor temperature for setting said mechanism and said separate device into operation to feed oil to the oil burner and to cut off the flow of gas to the gas burner whenever the outdoor temperature drops below said predetermined point.

17. The combination with a domestic heating system including a furnace and two fluid fuel burners in said furnace, of a mechanism adapted to feed fuel to one of said burners only, a main for supplying fuel to the other burner including a valve for regulating the amount of fuel supplied, a thermostat responsive to changes in indoor temperature, a thermostat responsive to changes in outdoor temperature, means under the control of both of said thermostats for opening said valve whenever the differential between indoor and outdoor temperatures exceeds a predetermined value, means controlled by the outdoor thermostat only for setting said mechanism into operation to feed fuel to the first named burner whenever the outdoor temperature falls below a predetermined point, an additional valve in the main leading to the second burner, and operative connections between said additional valve and the outdoor thermostat arranged to close said valve to prevent fuel flowing to the last named burner when the outdoor temperature drops below the point at which the mechanism for supplying fuel to the first burner is put in operation.

18. In a fluid fuel heating system, the combination of means for burning gas, a normally non-functioning oil burner, and means under the control of the weather temperature for putting said oil burner into operation and at the same time restricting the flow of gas to the gas burning means.

19. In a fluid fuel heating system, in combination, two fluid fuel burners, one adapted to burn a base fuel and one adapted to burn a secondary fuel, normally inoperative means for supplying fuel to said secondary fuel burner, and automatic mechanism for putting said means in operation and for simultaneously restricting the supply of fuel to said base fuel burner.

In testimony whereof I affix my signature.
HENRY L. DOHERTY.